(12) United States Patent
Luo et al.

(10) Patent No.: US 12,706,676 B2
(45) Date of Patent: Aug. 11, 2026

(54) BI-DIRECTIONAL AND MULTI-CHANNEL OPTICAL MODULE WITH SINGLE CAVITY ACCOMMODATING BOTH OPTICAL TRANSMITTER AND RECEIVER ASSEMBLIES

(71) Applicant: Global Technology Inc., Ningbo (CN)

(72) Inventors: Jian-Hong Luo, Ningbo (CN); Fu Chen, Ningbo (CN); Di Wang, Ningbo (CN)

(73) Assignee: Global Technology Inc., Ningbo (CN)

( * ) Notice: Subject to any disclaimer, the term of this patent is extended or adjusted under 35 U.S.C. 154(b) by 254 days.

(21) Appl. No.: 18/595,917

(22) Filed: Mar. 5, 2024

(65) Prior Publication Data

US 2025/0070881 A1 Feb. 27, 2025

(30) Foreign Application Priority Data

Aug. 23, 2023 (CN) ......................... 202311074272.1

(51) Int. Cl.
*H04B 10/50* (2013.01)
*G02B 6/42* (2006.01)
*H04B 10/61* (2013.01)

(52) U.S. Cl.
CPC ......... *H04B 10/506* (2013.01); *G02B 6/4215* (2013.01); *G02B 6/4246* (2013.01); *H04B 10/504* (2013.01); *H04B 10/614* (2013.01)

(58) Field of Classification Search
CPC .. H04B 10/506; H04B 10/504; H04B 10/614; H04B 10/40; H04B 10/25; H04B 10/503; G02B 6/4215; G02B 6/4246; G02B 6/29367; G02B 6/4269; G02B 6/4292; H04J 14/0216
See application file for complete search history.

(56) References Cited

U.S. PATENT DOCUMENTS

2008/0130696 A1* 6/2008 Shahine ................ H01S 5/0265 372/38.02
2019/0312646 A1* 10/2019 Earnshaw ......... H04J 14/02216
2022/0117488 A1* 4/2022 Padovani ................. A61B 3/16
2022/0326456 A1* 10/2022 Zhang .................... H04B 10/40

* cited by examiner

*Primary Examiner* — Hibret A Woldekidan
(74) *Attorney, Agent, or Firm* — Secant IP, P.L.L.C.

(57) ABSTRACT

A bi-directional and multi-channel optical module incudes a casing, an optical transmitter assembly, an optical receiver assembly and an optical fiber adaptor. The optical transmitter assembly is disposed in an accommodation space of the casing. The optical transmitter assembly includes a plurality of light emission units and a wavelength division multiplexer disposed corresponding to the plurality of light emission units. The optical receiver assembly is disposed in the accommodation space. The optical receiver assembly includes a plurality of light receiving units and a wavelength demultiplexer disposed corresponding to the plurality of light receiving units. The optical fiber adaptor is disposed on the casing.

16 Claims, 5 Drawing Sheets

BI-DIRECTIONAL AND MULTI-CHANNEL OPTICAL MODULE WITH SINGLE CAVITY ACCOMMODATING BOTH OPTICAL TRANSMITTER AND RECEIVER ASSEMBLIES

CROSS-REFERENCE TO RELATED APPLICATIONS

This application claims priority under 35 U.S.C. § 119(a) on Patent Application No(s). 202311074272.1 filed in China on Aug. 23, 2023, the entire contents of which are hereby incorporated by reference.

BACKGROUND

Technical Field

The present disclosure relates to a bi-directional and multi-channel optical module, more particularly to a bi-directional and multi-channel optical module with simplified package structure.

Related Art

Optical modules are generally installed in communication facilities in modern high-speed communication networks. With the improvement of optical communication system and the increase in demand of broad bandwidth by various network services, insufficient internal space and high energy consumption of the conventional optical modules should be overcome. Any solution to provide optical modules with small size, large amount of internal space for accommodation, and low energy consumption while enhancing bandwidth and transmission speed has been one of the important topics in this technical field.

SUMMARY

According to one aspect of the present disclosure, a bi-directional and multi-channel optical module incudes a casing, an optical transmitter assembly, an optical receiver assembly and an optical fiber adaptor. The optical transmitter assembly is disposed in an accommodation space of the casing. The optical transmitter assembly includes a plurality of light emission units and a wavelength division multiplexer disposed corresponding to the plurality of light emission units. The optical receiver assembly is disposed in the accommodation space. The optical receiver assembly includes a plurality of light receiving units and a wavelength demultiplexer disposed corresponding to the plurality of light receiving units. The optical fiber adaptor is disposed on the casing.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

With the gradual development of high-speed optical networks, a bi-directional configuration is taken as a replacement for the unidirectional configuration in a conventional optical module. In general, the bi-directional optical module may include a main casing for accommodating optical fiber adaptor and optical path folding element, and one or more subsidiary casings for respectively accommodating transmitter optical subassembly (TOSA) and receiver optical subassembly (ROSA). The optical coupling between the TOSA/ROSA and the optical fiber adaptor may be achieved by mounting the subsidiary casings on the main casing. The bi-directional optical module may be required to be designed into hermetically sealed structure due to MSA (Multi-Source Agreement). However, the configuration of a main casing mounted with subsidiary casings makes the optical module difficult to achieve hermetic sealing. Furthermore, in response to the application of passive optical network (PON) in high-speed optical networks, a conventional combination of multiple electro-absorption modulated lasers (EMLs) with a semiconductor optical amplifier (SOA) integrated chip are no longer able to meet the requirements of, for example, 50G (Gbps) high-speed PON.

According to one aspect of the present disclosure, the optical transmitter assembly and the optical receiver assembly are both accommodated in a single cavity, or even the optical transmitter assembly, the optical receiver assembly and the optical path folding element are all accommodated in a single cavity. Therefore, compared to the conventional configuration in which one or more TO-can package caps are mounted to a main casing, the optical module of the present disclosure enjoys hermetic sealing and better structural stability.

According to one aspect of the present disclosure, a lower cost lithium niobate modulator is used to modulate optical signals, such that the modulated optical signals have suitable wavelengths and bandwidths for long distance transmission applications. A configuration including EML emitter, DML emitter and lithium niobate modulator also facilitates the adjustment of the output power and the extinction ratios of the optical signals so as to meet the requirements of PON.

Figure 1:
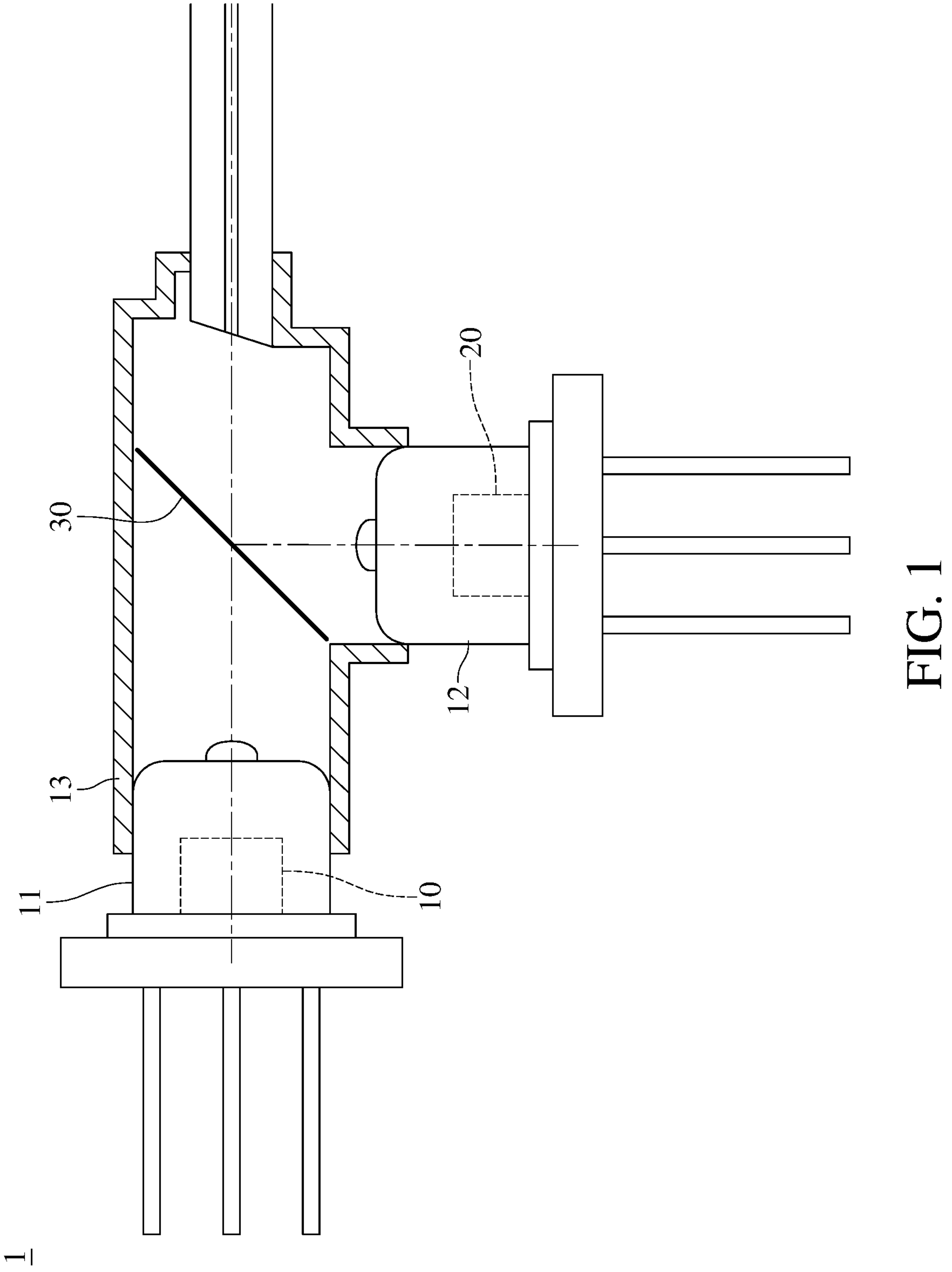
FIG. 1 is a schematic view of a bi-directional and multi-channel optical module according to a comparative example.

Please refer to FIG. 1, which is a schematic view of a bi-directional and multi-channel optical module according to a comparative example. A bi-directional and multi-channel optical module 1 may include a transmitter optical subassembly 10, a receiver optical subassembly 20 and an optical path folding element 30.

The transmitter optical subassembly 10 may be accommodated in a TO-can package cap 11, and the transmitter optical subassembly 10 may include laser emitter, thermoelectric cooler, coupling lens and optical isolator. The receiver optical subassembly 20 may be accommodated in another TO-can package cap 12, and the receiver optical subassembly 20 may include photodiode and transimpedance amplifier (TIA). The optical path folding element 30 may be accommodated in a main casing 13, and the optical path folding element 30 may be an optical filter. The optical filter may allow an optical signal output by the transmitter optical subassembly 10 to pass therethrough to reach a fiber optic port on the main casing 13. Also, the optical filter may change a traveling direction of an optical signal from the fiber optic port to be toward the receiver optical subassembly 20.

The TO-can package caps 11 and 12 may be welded with the main casing 13 so as to enable optical coupling among the transmitter optical subassembly 10, the receiver optical subassembly 20 and the fiber optic port. However, such package structure is difficult to be implemented as hermetic sealing. For example, the joints between the TO-can package caps 11, 12 and the main casing 13 may be difficult to be constantly sealed, or a transparent airtight window for hermetic sealing may be required so as to increase manufacturing cost. Accordingly, the present disclosure provides one or more improvements of the bi-directional and multi-channel optical module in order to solve the aforementioned problems.

Figure 2:
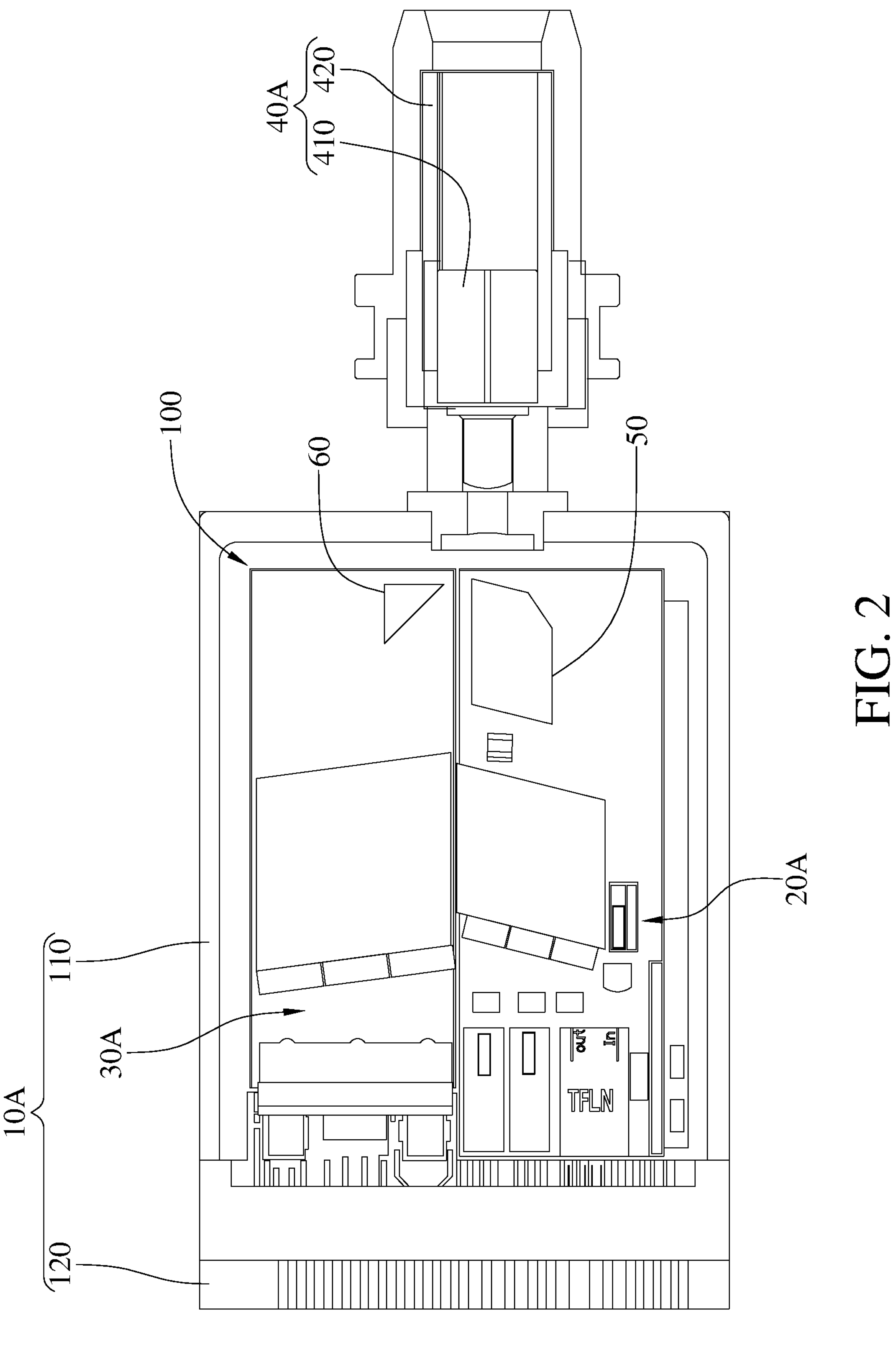
FIG. 2 is a schematic view of a bi-directional and multi-channel optical module according to one embodiment of the present disclosure.
Figure 3:
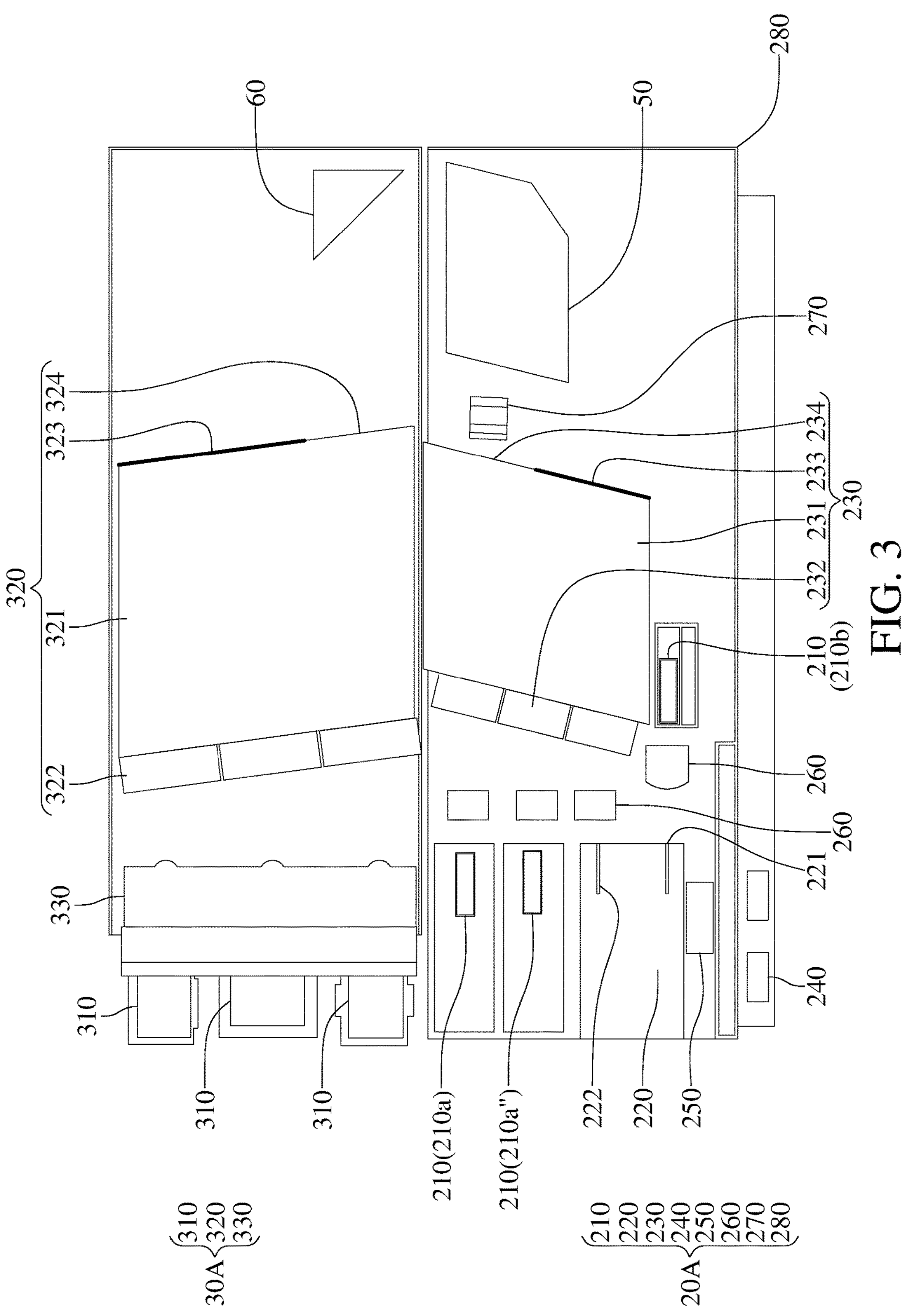
FIG. 3 is a schematic view of optical transmitter and receiver assemblies in FIG. 2.

Please refer to FIG. 2 and FIG. 3. FIG. 2 is a schematic view of a bi-directional and multi-channel optical module according to one embodiment of the present disclosure. FIG. 3 is a schematic view of optical transmitter and receiver assemblies in FIG. 2. In this embodiment, an optical module 1A may be a bi-directional and multi-channel optical module including a casing 10A, an optical transmitter assembly 20A, an optical receiver assembly 30A and an optical fiber adaptor 40A.

The casing 10A may be hermetic or non-hermetic. Specifically, the casing 10A may include a main body 110 and a ceramic circuit board 120, and the ceramic circuit board 120 is mounted to the main body 110 by a sealing solder so as to form an accommodation space 100. In this embodiment, the accommodation space 100 may be a single hermetic cavity formed by the main body 110 and the ceramic circuit board 120 of the casing 10A.

The optical transmitter assembly 20A may be disposed in the accommodation space 100, and the optical transmitter assembly 20A may include a plurality of light emission units 210 and a lithium niobate ($LiNbO_3$) modulator 220. Each of the light emission units 210 may be a laser emitter without any limitation to its bandwidth and wavelength. The lithium niobate modulator 220 may include an encapsulation and a lithium niobate chip in the encapsulation. The ceramic circuit board 120 may be electrically connected to the light emission units 210 and the lithium niobate modulator 220. The lithium niobate modulator 220 may have a light receiving port 221 and a light emitting port 222 at the same side. The lithium niobate modulator 220 may disposed corresponding to at least one of the light emission units 210. Specifically, the light emission units 210 may include an EML 210*a*, a direct modulated laser emitter (DML) 210*a*" and a continuous wave (CW) laser emitter 210*b* in this embodiment. The EML 210*a* and the DML 210*a*" may be configured to emit optical signals at 1490 nanometers (nm) and 1577 nm, respectively. The CW laser emitter 210*b* may be configured to emit optical signal at 1064 nm, and this optical signal may be received by the lithium niobate modulator 220 through the light receiving port 221. The optical signal may be modulated by the lithium niobate modulator 220, and the optical signal, which has been modulated, may be emitted by the lithium niobate modulator 220 through the light emitting port 222. It is noted that the present disclosure is not limited by the number of the EML and that of the DML depicted in the drawings.

The optical transmitter assembly 20A may further include a wavelength division multiplexer 230 disposed corresponding to the light emission units 210 to meet the requirements of PON. The wavelength division multiplexer 230 may be a Z-block including a waveguide body 231, a bandpass filter set 232, a total reflection unit 233 and an anti-reflective film 234. The waveguide body 231 may be in a shape of parallelogram or rhombus with its cross-section having suitable size for transmission using single-mode optical fiber. The waveguide body 231 may be made of any conventional waveguide material, such as silicon dioxide, a composite material formed by a lamination of silicon and germanium layers, a composite material formed by a lamination of silicon and silicon dioxide layers, and the like. The bandpass filter set 232 is located at a light receiving side of the waveguide body 231, as can be referred to the left side of the waveguide body 231 in FIG. 3. The bandpass filter set 232 may include a plurality of filters with different bandpasses, and the applicable wavelength of each filter corresponds to the operating wavelength of respective light emitting unit 210 (channel). The bandpass filter set 232 may enable the propagation of light with applicable wavelength, and the reflection of light with inapplicable wavelength. The filters of the bandpass filter set 232 may be formed as a one-pieced object, or independent filters arranged on the waveguide body 231. The total reflection unit 233 may be located at a light emitting side of the waveguide body 231, as can be referred to the right side of the waveguide body 231 in FIG. 3. In this embodiment, the total reflection unit 233 may be a coating or a reflective mirror enabling the reflection of all wavelengths. The total reflection unit 233 may be located at the light emitting side of the waveguide body 231 and does not cover the anti-reflective film 234. In other words, the anti-reflective film 234 is provided in a region at the light emitting side of the waveguide body 231 where the total reflection unit 233 does not overlap. In some other embodiments, if there is few refraction or total reflection of light at the interface between the waveguide body and the air, the anti-reflective film of the wavelength division multiplexer may not be required.

Moreover, the optical transmitter assembly 20A may further include a thermoelectric cooler 240, a thermistor 250, a plurality of coupling lenses 260, an optical isolator 270 and a heat sink 280. These elements may work with the light emission units 210 and/or the lithium niobate modulator 220, such that the optical transmitter assembly 20A may be referred as a transmitter optical subassembly (TOSA).

The optical receiver assembly 30A is disposed in the accommodation space 100, and the optical receiver assembly 30A may include a plurality of light receiving units 310 and a wavelength demultiplexer 320 disposed corresponding to the light receiving units 310. Each of the light receiving units 310 may be a combination of a photodiode and a TIA. The ceramic circuit board 120 may be electrically connected to the light receiving units 310. In this embodiment, the light receiving units 310 may have identical number to the light emission units 210.

The wavelength demultiplexer 320 may be a Z-block including a waveguide body 2321, a bandpass filter set 322, a total reflection unit 323 and an anti-reflective film 324. The waveguide body 321 may be in a shape of parallelogram or rhombus with its cross-section having suitable size for transmission using single-mode optical fiber. The waveguide body 321 may be made of any conventional waveguide material, such as silicon dioxide, a composite material formed by a lamination of silicon and germanium layers, a composite material formed by a lamination of silicon and silicon dioxide layers, and the like. The bandpass filter set 322 is located at a light receiving side of the waveguide body 321, as can be referred to the right side of the waveguide body 321 in FIG. 3. The bandpass filter set 322 may include a plurality of filters with different bandpasses, and the applicable wavelength of each filter corresponds to the operating wavelength of respective light receiving unit 310. The bandpass filter set 322 may enable the propagation of light with applicable wavelength, and the reflection of light with inapplicable wavelength. The filters of the bandpass filter set 322 may be formed as a one-pieced object, or independent filters arranged on the waveguide body 321. The total reflection unit 323 may be located at a light emitting side of the waveguide body 321, as can be referred to the left side of the waveguide body 321 in FIG. 3. In this embodiment, the total reflection unit 323 may be a coating or a reflective mirror enabling the reflection of all wavelengths. The anti-reflective film 324 may be located at the light emitting side of the waveguide body 321. In some other embodiments, the anti-reflective film of the wavelength demultiplexer may not be required.

In this embodiment, the optical receiver assembly 30A may further include an optical path folding element 330, and the optical path folding element 330 may be disposed between the wavelength demultiplexer 320 and the light receiving units 310. The optical path folding element 330 may be a reflective mirror or a combination of a reflective mirror and a lens. Since a light receiving surface of each light receiving unit 310 faces upward, the optical path folding element 330 can change a traveling direction of light from horizontal transmission into vertical transmission so as to facilitate the optical signals to be received by the light receiving unit 310.

Moreover, the optical receiver assembly 30A may further include a coupling lens, an optical isolator and a TIA for converting current signals into voltage signals. These elements may work with the light receiving units 310, such that the optical receiver assembly 30A may be referred as a receiver optical subassembly (ROSA).

The optical fiber adaptor 40A may be disposed on the casing 10A. Specifically, the optical fiber adaptor 40A may be bonded to the main body 110 of the casing 10A to be a fiber optic port. The optical fiber adaptor 40A may include a ceramic ferrule 410 and a ceramic sleeve where an external optical fiber (not shown in the drawings) may be inserted.

In this embodiment, the optical module 1A may further include a first optical path folding element 50 and a second optical path folding element 60. The first optical path folding element 50 and the second optical path folding element 60 may be disposed in the accommodation space 100. The first optical path folding element 50 may be disposed between the optical fiber adaptor 40A and the wavelength division multiplexer 230 of the optical transmitter assembly 20A, and the second optical path folding element 60 may be disposed at a light emitting side of the first optical path folding element 50.

The first optical path folding element 50 may be a beam splitter prism configured to change a traveling direction of an optical signal transmitted through the optical fiber adaptor 40A to be toward the optical receiver assembly 30A. Furthermore, the first optical path folding element 50 may also allow an optical signal output by the optical transmitter assembly 20A to pass therethrough, thereby reaching the optical fiber adaptor 40A. The second optical path folding element 60 may be a reflective mirror configured to change a traveling direction of the optical signal passing through the light emitting side of the first optical path folding element 50 to be toward the wavelength demultiplexer 320 of the optical receiver assembly 30A.

Figure 4:
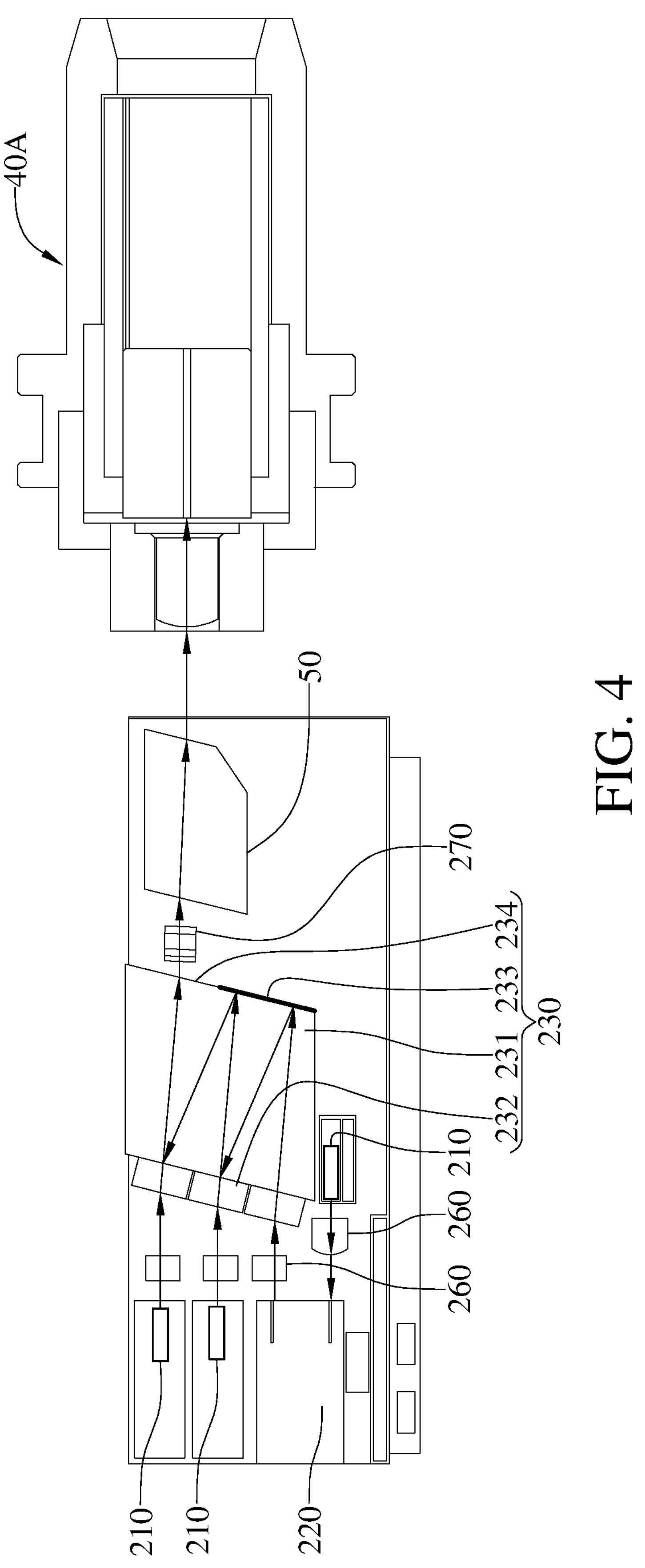
FIG. 4 is a schematic view showing an optical path of the optical transmitter assembly in FIG. 2.

FIG. 4 is a schematic view showing an optical path of the optical transmitter assembly in FIG. 2. Light rays generated by the light emission units 210, including optical signals output by the EML emitter, the DML emitter and the lithium niobate modulator 220, pass through the coupling lenses 260 to obtain multiple collimated beams. The three collimated beams (channels) pass the bandpass filter set 232 of the wavelength division multiplexer 230 so as to enter into the waveguide body 231. The three light beams entering into the waveguide body 231 propagates along a waveguide optical path in Z-shape or W-shape due to the reflection by the total reflection unit 233 so as to perform the next waveguide propagation. Since the three light beams are restricted to travel along a specific direction by the optical waveguide, the three light beams will finally exit the waveguide body through the anti-reflective film 234, and then through the optical isolator 270 and the first optical path folding element 50 to be coupled with the optical fiber adaptor 40A.

Figure 5:
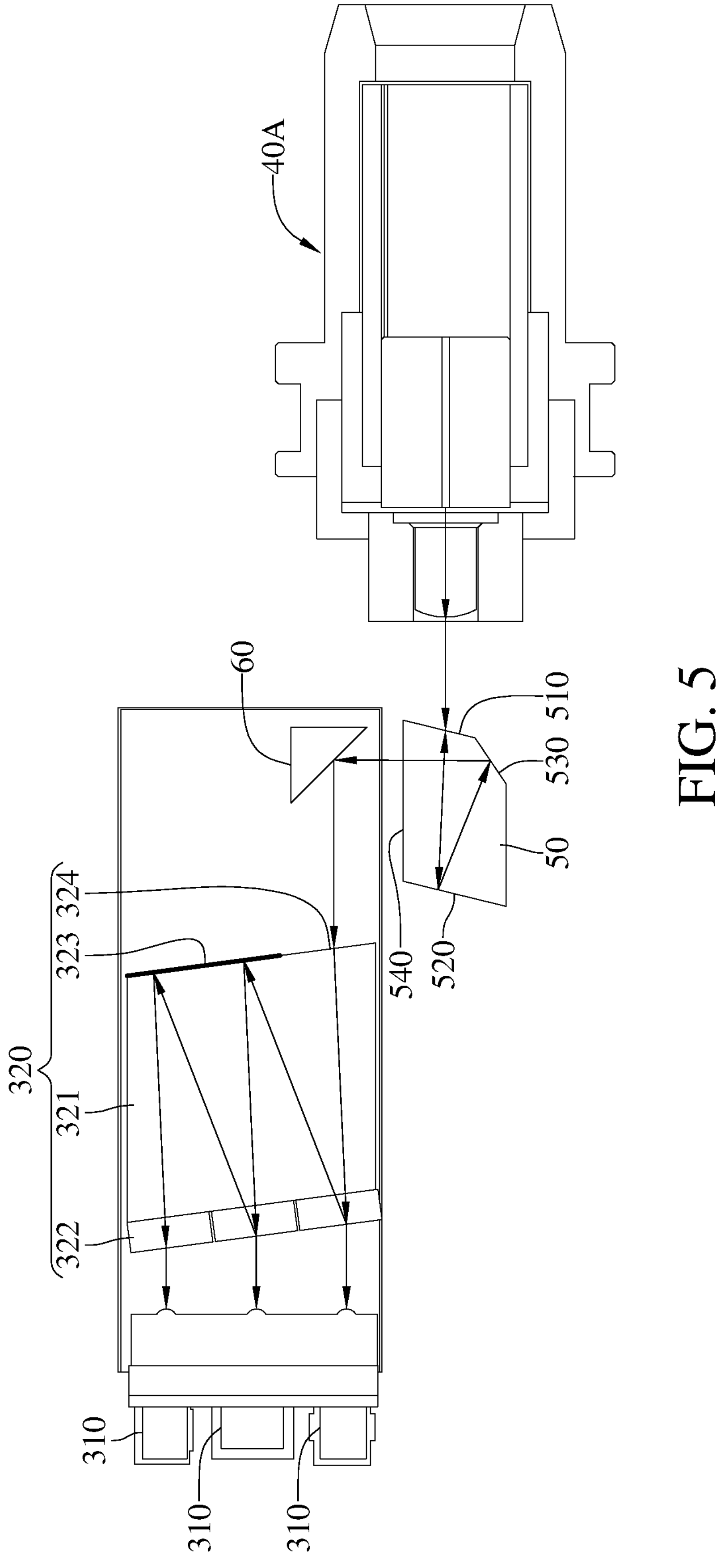
FIG. 5 is a schematic view showing an optical path of the optical receiver assembly in FIG. 2.

FIG. 5 is a schematic view showing an optical path of the optical receiver assembly in FIG. 2. An external optical signal enters into the casing 10A through the optical fiber adaptor 40A. The external optical signal passes through an optical surface 510 to enter into the first optical path folding element 50, and the external optical signal is deflected due to its refraction at the optical surface 510 of the first optical path folding element 50. The external optical signal is then deflected two times due to its reflection on the optical surfaces 520 and 530 of the first optical path folding element 50, and exits the first optical path folding element 50 through an optical surface 540 of the first optical path folding element 50 (the light emitting side of the first optical path folding element 50). The external optical signal exiting the first optical path folding element 50 reaches the second optical path folding element 60, and is deflected at least one time due to its reflection by the second optical path folding element 60. The external optical signal reflected by the second optical path folding element 60 subsequently enters into the waveguide body 321 of the wavelength demultiplexer 320. The external optical signal entering into the waveguide body 321 propagates along a waveguide optical path in Z-shape or W-shape due to the reflection by the total reflection unit 323 so as to perform the next waveguide propagation, and finally three light rays (channels) with different wavelengths can be obtained. Therefore, the external optical signal can be received by the light receiving units 310 that is non-coaxial with the optical fiber adaptor 40A. The light receiving units 310 can convert the received external optical signal into electrical signals in response thereto. It is noted that the present disclosure is not limited by the times of optical path folding described above.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A bi-directional and multi-channel optical module, comprising:

a casing;

an optical transmitter assembly disposed in an accommodation space of the casing, wherein the optical transmitter assembly comprises a plurality of light emission units and a wavelength division multiplexer disposed corresponding to the plurality of light emission units;

an optical receiver assembly, disposed in the accommodation space, wherein the optical receiver assembly comprises a plurality of light receiving units and a wavelength demultiplexer disposed corresponding to the plurality of light receiving units;

an optical fiber adaptor disposed on the casing;

a first optical path folding element, wherein the first optical path folding element is disposed between the optical fiber adaptor and the wavelength division multiplexer of the optical transmitter assembly; and a second optical path folding element, wherein the second optical path folding element is disposed at a light emitting side of the first optical path folding element.

2. The bi-directional and multi-channel optical module according to claim 1, wherein the accommodation space is a single cavity formed by the casing.

3. The bi-directional and multi-channel optical module according to claim 1, wherein the accommodation space is a hermetic cavity formed by the casing.

4. The bi-directional and multi-channel optical module according to claim 1, wherein the optical transmitter assembly further comprises a lithium niobate modulator, and the lithium niobate modulator is disposed corresponding to at least one of the plurality of light emission units.

5. The bi-directional and multi-channel optical module according to claim 4, wherein the plurality of light emission units comprises an electro-absorption modulated laser emitter (EML), a direct modulated laser emitter (DML) and a continuous wave (CW) laser emitter, and the lithium niobate modulator is disposed corresponding to the CW laser emitter.

6. The bi-directional and multi-channel optical module according to claim 1, wherein the first optical path folding element is a beam splitter prism configured to change a traveling direction of optical signal transmitted through the optical fiber adaptor to be toward the optical receiver assembly, and optical signal output by the optical transmitter assembly is allowed to pass through the beam splitter prism to reach the optical fiber adaptor.

7. The bi-directional and multi-channel optical module according to claim 1, wherein the second optical path folding element is a reflective mirror configured to change a traveling direction of optical signal passing through the light emitting side of the first optical path folding element to be toward the wavelength demultiplexer.

8. The bi-directional and multi-channel optical module according to claim 1, wherein both the first optical path folding element and the second optical path folding element are disposed in the accommodation space.

9. A bi-directional and multi-channel optical module, comprising:

a casing;

an optical transmitter assembly disposed in an accommodation space of the casing, wherein the optical transmitter assembly comprises a plurality of light emission units, a wavelength division multiplexer disposed corresponding to the plurality of light emission units, and a lithium niobate modulator disposed corresponding to at least one of the plurality of light emission units;

an optical receiver assembly, disposed in the accommodation space, wherein the optical receiver assembly comprises a plurality of light receiving units and a wavelength demultiplexer disposed corresponding to the plurality of light receiving units; and an optical fiber adaptor disposed on the casing;

wherein the plurality of light emission units comprises an electro-absorption modulated laser emitter (EML), a direct modulated laser emitter (DML) and a continuous wave (CW) laser emitter, and the lithium niobate modulator is disposed corresponding to the CW laser emitter.

10. The bi-directional and multi-channel optical module according to claim 9, wherein the accommodation space is a single cavity formed by the casing.

11. The bi-directional and multi-channel optical module according to claim 9, wherein the accommodation space is a hermetic cavity formed by the casing.

12. The bi-directional and multi-channel optical module according to claim 9, further comprising a first optical path folding element, wherein the first optical path folding element is disposed between the optical fiber adaptor and the wavelength division multiplexer of the optical transmitter assembly.

13. The bi-directional and multi-channel optical module according to claim 12, wherein the first optical path folding element is a beam splitter prism configured to change a traveling direction of optical signal transmitted through the optical fiber adaptor to be toward the optical receiver assembly, and optical signal output by the optical transmitter assembly is allowed to pass through the beam splitter prism to reach the optical fiber adaptor.

14. The bi-directional and multi-channel optical module according to claim 12, further comprising a second optical path folding element, wherein the second optical path folding element is disposed at a light emitting side of the first optical path folding element.

15. The bi-directional and multi-channel optical module according to claim 14, wherein the second optical path folding element is a reflective mirror configured to change a traveling direction of optical signal passing through the light emitting side of the first optical path folding element to be toward the wavelength demultiplexer.

16. The bi-directional and multi-channel optical module according to claim 14, wherein both the first optical path folding element and the second optical path folding element are disposed in the accommodation space.

* * * * *